(12) United States Patent
Sun et al.

(10) Patent No.: US 10,318,048 B2
(45) Date of Patent: Jun. 11, 2019

(54) ARRAY SUBSTRATE, DISPLAY PANEL AND DRIVING METHOD THEREOF, AND DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Ying Sun, Xiamen (CN); Yumin Xu, Xiamen (CN); Xiaojing Zhan, Xiamen (CN); Wenqiang Yang, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 33 days.

(21) Appl. No.: 15/299,807

(22) Filed: Oct. 21, 2016

(65) Prior Publication Data
US 2017/0038903 A1    Feb. 9, 2017

(30) Foreign Application Priority Data

Aug. 2, 2016    (CN) .......................... 2016 1 0622733

(51) Int. Cl.
*G06F 3/041*    (2006.01)
*G06F 3/044*    (2006.01)
(Continued)

(52) U.S. Cl.
CPC ........ *G06F 3/0416* (2013.01); *G02F 1/13338* (2013.01); *G06F 3/044* (2013.01); *G06F 3/0412* (2013.01); *G09G 3/36* (2013.01); *G02F 1/134336* (2013.01); *G02F 1/136286* (2013.01); *G02F 2001/134345* (2013.01); *G06F 2203/04105* (2013.01)

(58) Field of Classification Search
CPC .......... G02F 1/13338; G02F 1/134336; G02F 1/136286; G02F 2001/134345; G06F 3/0412; G06F 3/0416; G06F 3/044; G06F 2203/04105

See application file for complete search history.

(56) References Cited

U.S. PATENT DOCUMENTS

| | | | |
|---|---|---|---|
| 9,164,605 B1 * | 10/2015 | Pirogov | .................. G06F 3/041 |
| 2013/0257774 A1 * | 10/2013 | Kim | .................... H01L 27/1259 345/173 |

(Continued)

FOREIGN PATENT DOCUMENTS

| | | | | |
|---|---|---|---|---|
| CN | 102999219 A | 3/2013 | | |
| CN | 103018992 A | 4/2013 | | |
| WO | WO 2016074357 A1 * | 5/2016 | ............. | G06F 3/044 |

*Primary Examiner* — Stacy Khoo
(74) *Attorney, Agent, or Firm* — Anova Law Group, PLLC (57) ABSTRACT

An array substrate, a display panel, and a driving method are provided. The array substrate includes a plurality of sub-pixels arranged in an array along a row direction and a column direction, and a plurality of touch-control electrodes arranged along the row direction. Each touch-control electrode includes a plurality of touch-control sub-electrodes arranged along the row direction. Each touch-control sub-electrode provides a data signal to a column of sub-pixels during a display stage, respectively, and each touch-control sub-electrode receives a touch detection signal during a touch detection stage.

17 Claims, 7 Drawing Sheets

(51) Int. Cl.
  *G02F 1/1333* (2006.01)
  *G09G 3/36* (2006.01)
  *G02F 1/1343* (2006.01)
  *G02F 1/1362* (2006.01)

(56) References Cited

U.S. PATENT DOCUMENTS

| | | | |
|---|---|---|---|
| 2013/0335366 A1* | 12/2013 | Lee | G06F 3/044 |
| | | | 345/174 |
| 2014/0048854 A1* | 2/2014 | Wang | G06F 3/0412 |
| | | | 257/254 |
| 2014/0211122 A1* | 7/2014 | Wurzel | G02F 1/133308 |
| | | | 349/61 |
| 2015/0277628 A1* | 10/2015 | Leong | G06F 3/0416 |
| | | | 345/174 |
| 2016/0062505 A1* | 3/2016 | Hwang | G06F 3/0412 |
| | | | 345/174 |
| 2016/0283002 A1* | 9/2016 | Liu | G06F 3/0412 |
| 2016/0291773 A1* | 10/2016 | Wang | G06F 3/044 |

\* cited by examiner

ARRAY SUBSTRATE, DISPLAY PANEL AND DRIVING METHOD THEREOF, AND DISPLAY DEVICE

CROSS-REFERENCES TO RELATED APPLICATIONS

This application claims priority of Chinese Patent Application No. 201610622733.8, filed on Aug. 2, 2016, the entire contents of which are hereby incorporated by reference.

FIELD OF THE INVENTION

The present disclosure generally relates to the field of display technology and, more particularly, relates to an array substrate, a display panel, a driving method thereof, and a display device.

BACKGROUND

According to touch detection principles, touch-control display panels can be divided into self-capacitive touch-control display panels and mutual-capacitive touch-control display panels. In the structure of a mutual-capacitive touch-control display panel, stripe-shaped electrodes extending along the direction of data lines are disposed on an array substrate and are used as touch-control reference electrodes or touch-control sensing electrodes. When performing touch detection, a driving circuit is connected to each stripe-shaped electrode at one end of the stripe-shaped electrode, thus providing a touch-control reference signal to the stripe-shaped electrodes or receiving a touch-control sensing signal. Often, the driving circuit is disposed on one end of the data lines along the extension direction. Because the stripe-shaped electrodes have a relatively high resistance, when the touch-control reference signal is transmitted from an end of each stripe-shaped electrode that is relatively close to the driving circuit to an end of the striped-shaped electrode that is relatively far from the driving circuit, the touch-control reference signal may decay. When the touch-control sensing signal is transmitted from the end of each stripe-shaped electrode that is relatively far from the driving circuit to the end of the stripe-shaped electrode that is relatively close to the driving circuit, the touch-control sensing signal may also decay. Accordingly, the touch-control signal strengths on a near end of the stripe-shaped electrode and a far end of the stripe-shaped electrode may be different, resulting in reduced touch-control sensitivity and increased driving power.

The disclosed array substrate, display panel and driving method thereof, and display device are directed to solve one or more problems set forth above and other problems.

BRIEF SUMMARY OF THE DISCLOSURE

One aspect of the present disclosure provides an array substrate, and a display panel including the array substrate and a color film substrate disposed opposite to the array substrate. The array substrate includes a plurality of sub-pixels arranged in an array along a row direction and a column direction, and a plurality of touch-control electrodes arranged along the row direction. Each touch-control electrode includes a plurality of touch-control sub-electrodes arranged along the row direction. Each touch-control sub-electrode provides a data signal to a column of sub-pixels during a display stage, respectively, and each touch-control sub-electrode receives a touch detection signal during a touch detection stage.

Another aspect of the present disclosure provides a driving method for driving the display panel for display and touch control during a frame display period. The array substrate includes a plurality of sub-pixels arranged in an array along a row direction and a column direction, and a plurality of touch-control electrodes arranged along the row direction. Each touch-control electrode includes a plurality of touch-control sub-electrodes arranged along the row direction. Each touch-control sub-electrode provides a data signal to a column of sub-pixels during a display stage, respectively, and each touch-control sub-electrode receives a touch detection signal during a touch detection stage. During each display stage, the driving method provides a common voltage signal to stripe-shaped common electrodes and provides a data signal to touch-control sub-electrodes. During a touch detection stage, the driving method provides a touch detection signal to the touch-control sub-electrodes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

As discussed above, the touch-control signal strengths on a near end of the stripe-shaped electrode and a far end of the stripe-shaped electrode may be different, resulting in reduced touch-control sensitivity and increased driving power.

The present disclosure provides an improved array substrate, display panel, driving method thereof, and display device. In the disclosed display device, touch-control sub-electrodes are multiplexed during a display stage to provide a data signal to sub-pixels, which effectively reduces the resistance of the touch-control electrodes, thus lowering signal loss during the signal transmission process. Accordingly, touch-control sensitivity of display panels may be improved and driving power may be simultaneously reduced.

Figure 1:
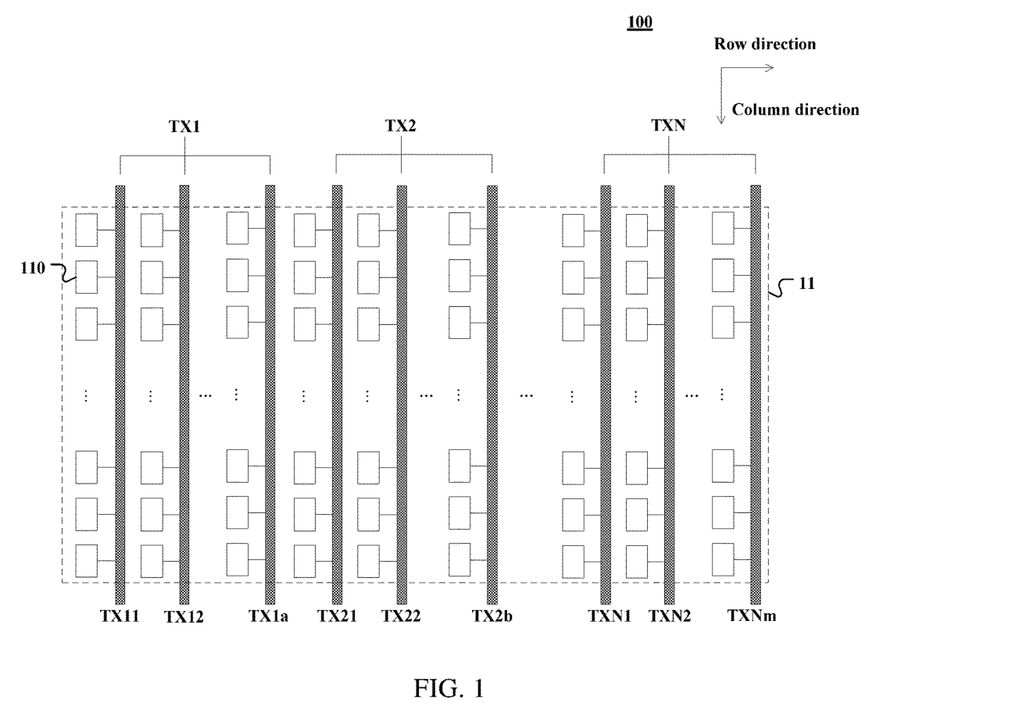
FIG. 1 illustrates an exemplary array substrate consistent with disclosed embodiments.

Referring to FIG. 1, FIG. 1 illustrates an exemplary array substrate consistent with disclosed embodiments. As shown in FIG. 1, an array substrate 100 may include a plurality of sub-pixels 110 arranged along a row direction and a column direction, and a plurality of touch-control electrodes from TX1, TX2, ..., to TXN arranged along the row direction, where N is a positive integer Each touch-control electrode may include a plurality of touch-control sub-electrodes arranged along the row direction. For example, the touch-control electrode TX1 may include a plurality of touch-control sub-electrodes with a total number of 'a' (from TX11, TX12, ..., to TX1a) arranged along the row direction. The touch-control electrode TX2 may include a plurality of touch-control sub-electrodes with a total number of 'b' (from TX21, TX22, ..., to TX2b) arranged along the row direction, and the touch-control electrode TXN may include a plurality of touch-control sub-electrodes with a total number of 'm' (from TXN1, TXN2, ..., to TXNm) arranged along the row direction, where 'a', 'b', and 'm' are positive integers.

As shown in FIG. 1, a sub-pixel array 11 containing the plurality of sub-pixels 110 arranged along the row direction and the column direction may be disposed in a display area. During the display stage, the sub-pixels 110 may be driven to display a desired color. The touch-control electrodes (from TX1, TX2, ..., to TXN) may be disposed in the display area, and during a touch detection stage, the touch-control electrodes may be used to receive a touch detection signal. Specifically, each touch-control sub-electrode (TX11, TX12, ..., TX1a, TX21, TX22, ..., TX2b, TXN1, TXN2, ..., TXNm) may, during the display stage, provide a data signal to a corresponding column of sub-pixels in the sub-pixel array 11, respectively. Each touch-control sub-electrode (TX11, TX12, ...,TX1a, TX21, TX22, ...,TX2b, TXN1, TXN2, ..., TXNm) may, during the touch detection stage, receive a touch detection signal.

During the display stage, as a data line, each touch-control sub-electrode may transmit the data signal to the sub-pixels, and the sub-pixels may display a corresponding brightness according to the corresponding data signal. During the touch detection stage, each touch-control electrode may receive the touch detection signal. That is, each touch-control sub-electrode may receive the touch detection signal, and a display panel containing the array substrate 100 may determine a touch-control point based on a returned touch-control sensing signal.

Further, in some embodiments, during each touch detection stage, the touch detection signal may be sequentially supplied to the plurality of touch-control electrodes. In particular, the touch detection signal may be supplied to all touch-control sub-electrodes in a same touch-control electrode simultaneously. That is, during each touch detection stage, the touch detection signal may be sequentially supplied to touch-control electrodes (from TX1, TX2, ..., to TXN) in particular ways.

When providing the touch detection signal to the touch-control electrode TX1, the touch detection signal may be supplied to all touch-control sub-electrodes (from TX11, TX12, ..., to TX1a) in the touch-control electrode TX1 simultaneously. When providing the touch detection signal to the touch-control electrode TX2, the touch detection signal may be supplied to all touch-control sub-electrodes (from TX21, TX22, ..., to TX2b) in the touch-control electrode TX2 simultaneously. When providing the touch detection signal to the touch-control electrode TXN, the touch detection signal may be supplied to all touch-control sub-electrodes (from TXN1, TXN2, ..., to TXNm) in the touch-control electrode TXN simultaneously. Accordingly, all touch-control electrodes may be scanned during each touch detection stage, thus lowering a frequency of the display panel switching between a display state and a touch detection state, which reduces power consumption.

In some other embodiments, at least N times display and N times touch detection may be performed during a frame display period, where N is the total number of the touch-control electrodes included in the array substrate. During each touch detection stage, all touch-control sub-electrodes in the same touch-control electrode may be provided with the touch detection signal, respectively.

That is, only one touch-control electrode may be scanned during each touch detection stage and, when scanning the touch-control electrode, the touch detection signal may be simultaneously supplied to all touch-control sub-electrodes belonging to the touch-control electrode.

For example, the touch detection signal may be supplied to all sub-electrodes (TX11, TX1, ..., TX1a) in the touch-control electrode TX1 during a first touch detection stage. The touch detection signal may be supplied to all sub-electrodes (TX21, TX22, ..., TX2b) in the touch-control electrode TX2 during a second touch detection stage. The touch detection signal may be supplied to all sub-electrodes (TXN1, TXN2, ..., TXNm) in the touch-control electrode TXN during an N touch detection stage. Accordingly, all touch-control electrodes may be scanned in the frame display period. In each touch detection stage, only one touch-control electrode may be scanned, thus elongating touch detection duration of each touch-control electrode, which is beneficial for improving touch detection accuracy.

Further, touch detection signals different from each other may be supplied to the plurality of touch-control electrodes from TX1, TX2, ..., to TXN during one touch detection stage. For example, a pulse signal with different periods or different signal strengths may be supplied to the plurality of touch-control electrodes from TX1, TX2, ..., to TXN. Accordingly, if a plurality of touch-control electrodes are scanned during one touch detection stage, the number of touch detections executed per unit of time may be increased, thus effectively increasing a report rate for a touch-control function.

In the above embodiments, touch-control sub-electrodes TX11, TX12, ..., TX1a, TX21, TX22, ..., TX2b, TXN1, TXN2, ..., TXNm may be arranged along a row direction of the sub-pixel array 11, and extend along a column direction of the sub-pixel array 11. Each touch-control electrode TX1, TX2, ..., TXN may include a plurality of touch-control sub-electrodes, and each touch-control sub-electrode TX11, TX12, ..., TX1a, TX21, TX22, ..., TX2b, TXN1, TXN2, . . . , TXNm may be fabricated using materials with a relatively small resistivity.

Optionally, a metallic material (e.g., Cu) may be used to fabricate each touch-control sub-electrode, thus controlling the resistance of the touch-control electrodes to be relatively small. Further, each touch-control sub-electrode may be electrically connected in parallel via switch units to form a touch-control electrode, thus further lowering the resistance of the touch-control electrodes. Compared to the technical solution that applies full stripe-shaped electrodes as touch-control electrodes, signal decay generated during signal transmission may be effectively reduced, thus improving touch-control sensitivity of the display panel.

In the above embodiments, each touch-control sub-electrode may be connected to a corresponding column of sub-pixels via a switch unit, such as a thin film transistor (TFT). During the display stage, the thin film transistor may be turned on, and each touch-control sub-electrode may be electrically connected to the corresponding column of sub-pixels. During the touch detection stage, the thin-film transistor may be turned off, and the display of sub-pixels may not be influenced by signals transmitted on the touch-control sub-electrodes.

Figure 2:
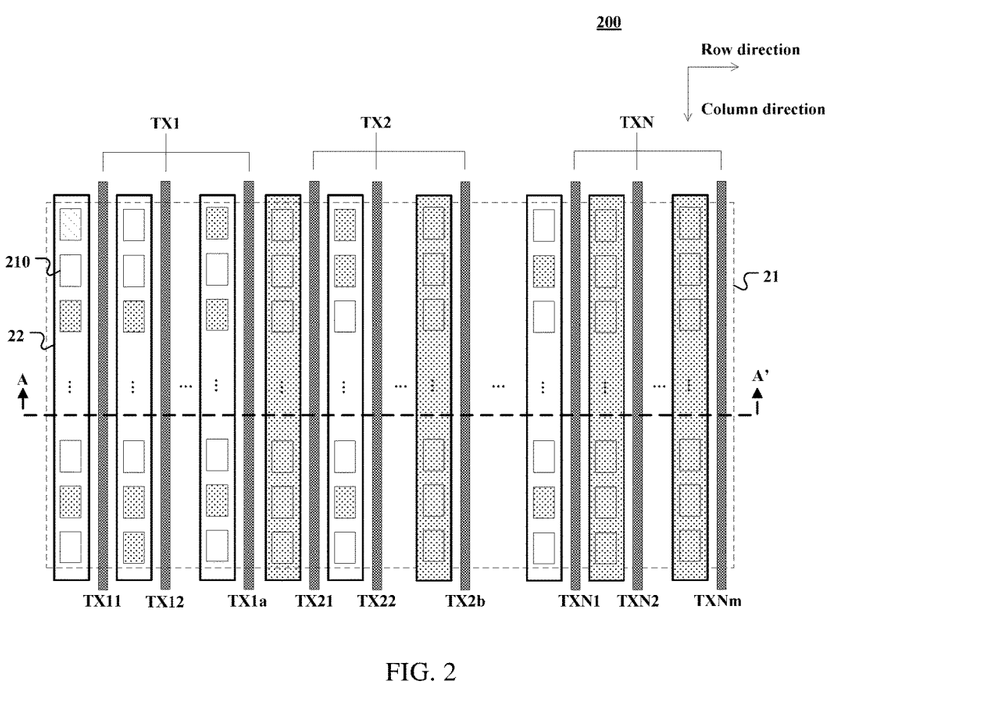
FIG. 2 illustrates another exemplary array substrate consistent with disclosed embodiments.

Further referring to FIG. 2, FIG. 2 illustrates another exemplary array substrate consistent with disclosed embodiments. As shown in FIG. 2, an array substrate 200 may include sub-pixels 210 arranged in an array along the row direction and the column direction, and a plurality of touch-control electrodes TX1, TX2, . . . , TXN arranged along the row direction, where N is a positive integer.

Each touch-control electrode may include a plurality of touch-control sub-electrodes arranged along the row direction. For example, the touch-control electrode TX1 may include a plurality of touch-control sub-electrodes with a total number of 'a' (TX11, TX12, . . . , TX1a) arranged along the row direction. The touch-control electrode TX2 may include a plurality of touch-control sub-electrodes with a total number of 'b' (TX21, TX22, . . . , TX2b) arranged along the row direction, and the touch-control electrode TXN may include a plurality of touch-control sub-electrodes with a total number of 'm' (TXN1, TXN2, . . . , TXNm) arranged along the row direction, where 'a', 'b', and 'm' are positive integers.

In FIG. 2, a sub-pixel array 21 containing a plurality of sub-pixels 210 arranged along the row direction and the column direction may be disposed in the display area. During the display stage, each touch-control sub-electrode TX11, TX12, . . . , TX1a, TX21, TX22, . . . , TX2b, TXN1, TXN2, . . . , TXNm may provide the data signal to a column of sub-pixels 210, respectively. During the touch detection stage, each touch control sub-electrode TX11, TX12, . . . , TX1a, TX21, TX22, . . . , TX2b, TXN1, TXN2, . . . , TXNm may receive the touch detection signal.

Based on the disclosed embodiment in FIG. 1, an array substrate 200 in FIG. 2 may also include a plurality of stripe-shaped common electrodes 22 arranged along a row direction of the sub-pixel array 21. Each touch-control sub-electrode TX11, TX12, . . . , TX1a, TX21, TX22, . . . , TX2B, TXN1, TXN2, . . . , TXNm may be disposed between two adjacent stripe-shaped common electrodes 22.

Further, as shown in FIG. 2, in some embodiments, between any two adjacent stripe-shaped common electrodes 22, one touch-control sub-electrode TX11, TX12, . . . , TX1a, TX21, TX22, . . . , TX2b, TXN1, TXN2, . . . , or TXNm may be disposed. That is, each column of sub-pixels 210 may correspond to one stripe-shaped common electrode 22. By then, the width of the stripe-shaped common electrode 22 may be slightly smaller than a sum of the sub-pixel width and the distance between two adjacent columns of sub-pixels. The stripe-shaped common electrode 22 may receive a common voltage signal during the display stage, and the sub-pixels may receive the data signal.

An electric field may form between the stripe-shaped common electrodes 22 and the sub-pixel electrodes 210 to drive liquid crystal molecules to rotate a certain angle. Accordingly, light emitted by a backlight source disposed on a back side of the array substrate 200 may show a changed polarization direction after passing through rotated liquid crystals. Further, polarizers may be utilized to control light emission amount, thus controlling illumination brightness and realizing image display. A plurality of stripe-shaped common electrodes 22 may be electrically connected, for example, via wires that connect two ends of the stripe-shaped common electrodes along the extension direction.

In some other embodiments, touch-control sub-electrodes may not be disposed between two adjacent stripe-shaped common electrodes, and each column of sub-pixels may correspond to a plurality of stripe-shaped common electrodes. For example, a column of sub-pixels may correspond to two stripe-shaped common electrodes, and the width of each stripe-shaped common electrode may be half of the width of the sub-pixels.

In the above embodiments, the stripe-shaped common electrodes may be formed by cutting a series of trenches on a planar electrode along the column direction of the sub-pixel array, and touch-control sub-electrodes may be disposed in the trenches. Any appropriate material with a relatively small resistivity, such as metals, may be used to fabricate the touch-control sub-electrodes, thus effectively reducing the resistance of the touch-control electrodes, and ensuring a consistency between touch-control signal strength at one end of the touch-control electrodes along the extension direction and the touch-control signal strength at the other end of the touch-control electrodes along the extension direction.

Accordingly, touch-control sensitivity of each area in the display panel may remain consistent, thus improving accuracy of the touch-control function. Further, touch-control sub-electrodes may be disposed in divisions to avoid a shielding effect of common electrodes towards the touch-control signal, thus ensuring that the touch-control signal may remain uninfluenced, and the touch-control sensitivity of the display panel may be improved.

In some embodiments, the disclosed touch-control sub-electrodes may be data lines. Compared to using a whole indium tin oxide (ITO) stripe-shaped electrode as the touch-control electrode, in the present disclosure, the data lines may often be metal lines whose resistance may be far smaller than that of the whole ITO stripe-shaped electrode, thus significantly reducing the resistance of the touch-control electrodes. Simultaneously, because the data lines may be directly connected to an integrated driving circuit, the data lines may be multiplexed as touch-control sub-electrodes, and the integrated driving circuit may directly provide the touch detection signal to the touch-control sub-electrodes or directly receive a returned touch-control sensing signal from the touch-control sub-electrodes. Accordingly, touch-control signal lines may be no longer needed, thus simplifying wiring design of the array substrate, and further narrowing a frame area of the display panel.

In some embodiments, the touch-control electrodes TX1, TX2, . . . , TXN and the stripe-shaped common electrodes 22 may be disposed on different layers. Optionally, the touch-control electrodes TX1, TX2, . . . , TXN and the stripe-shaped common electrodes 22 may be disposed on different ITO layers. Optionally, the touch-control electrodes TX1, TX2, . . . , TXN and the stripe-shaped common electrodes 22 may be disposed on different metallic layers. Optionally, the touch-control electrodes TX1, TX2, . . . , TXN may be disposed on a metallic layer, and the stripe-shaped common electrodes 22 may be disposed on an ITO layer.

Figure 3:
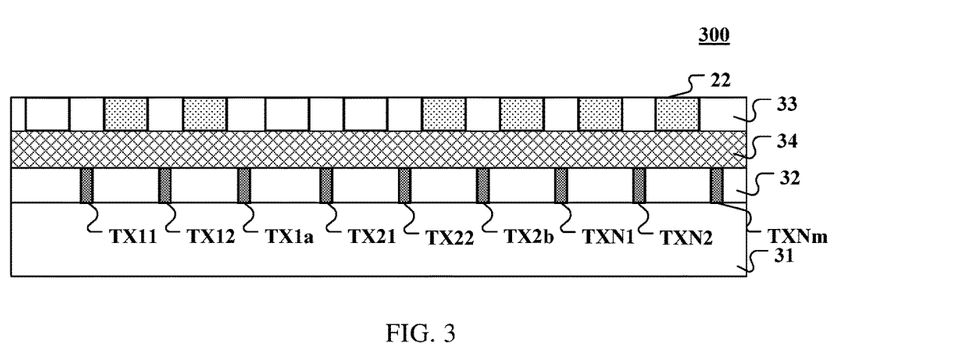
FIG. 3 illustrates an AA' cross-sectional view of an exemplary array substrate in FIG. 2 consistent with disclosed embodiments.

Referring to FIG. 3, FIG. 3 illustrates an AA' cross-sectional view of an exemplary array substrate in FIG. 2 consistent with disclosed embodiments. As shown in FIG. 3, an array substrate 300 may include a first conductive layer 32 and a second conductive layer 33 disposed on a substrate 31. An insulation layer 34 may be sandwiched between the first conductive layer 32 and the second conductive layer 33. The touch-control sub-electrode TX11, TX12, . . . , TX1a, TX21, TX22, . . . , TX2b, TXN1, TXN2, . . . , TXNm may be disposed on the first conductive layer 32, and the stripe-shaped common electrodes 22 may be disposed on the second conductive layer 33.

In some embodiments, the touch-control sub-electrodes TX11, TX12, . . . , TX1a, TX21, TX22, . . . , TX2b, TXN1, TXN2, . . . , TXNm may be disposed on a same layer as source electrodes and drain electrodes of thin film transistors (TFTs) on the array substrate 300. And the stripe-shaped common electrodes 22 may be disposed on one side of the touch-control sub-electrodes TX11, TX12, . . . , TX1a, TX21, TX22, . . . , TX2b, TXN1, TXN2, . . . , TXNm that faces away the substrate 31. Locations of each division between two adjacent stripe-shaped common electrodes 22 may correspond to locations of each touch-control sub-electrode TX11, TX12, . . . , TX1a, TX21, TX22, . . . , TX2b, TXN1, TXN2, . . . , TXNm.

Figure 4:
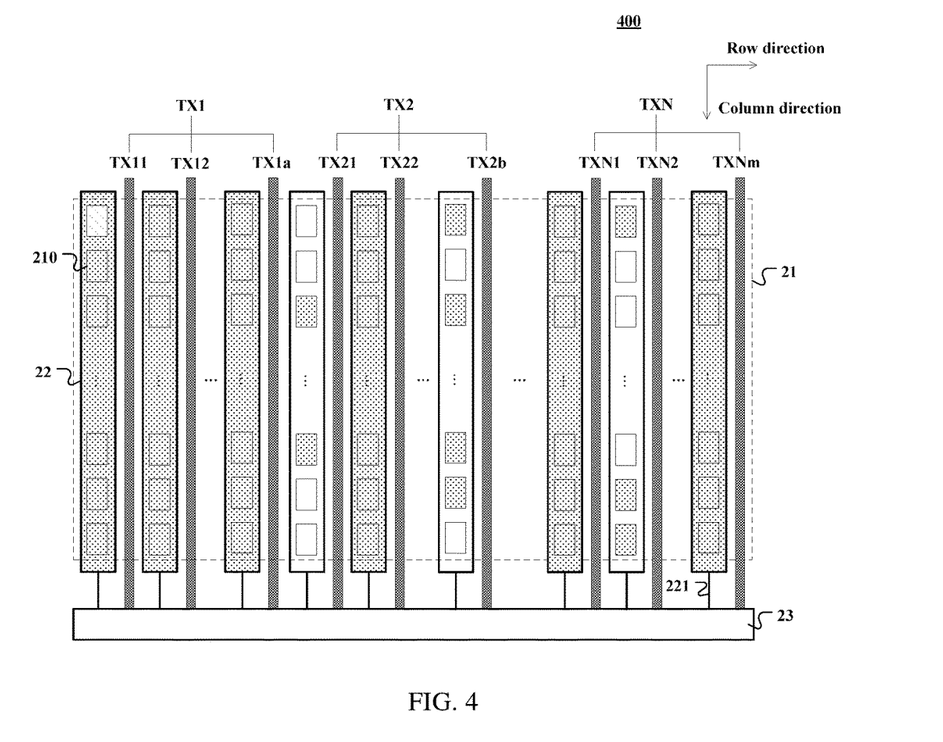
FIG. 4 illustrates another exemplary array substrate consistent with disclosed embodiments.

Further, referring to FIG. 4, FIG. 4 illustrates another exemplary array substrate consistent with disclosed embodiments. As shown in FIG. 4, based on an embodiment illustrated in FIG. 3, an array substrate 400 in FIG. 4 may also include a driving circuit 23 and common electrode lines 221.

The driving circuit 23 may be electrically connected to the touch-control sub-electrodes TX11, TX12, . . . , TX1a, TX21, TX22, . . . , TX2b, TXN1, TXN2, . . . , TXNm. The driving circuit 23 may be electrically connected to the stripe-shaped common electrodes 22 via the common electrode lines 221. Further, the driving circuit 23 may be electrically connected to one stripe-shaped common electrode 22 via a corresponding common electrode line 221, respectively.

In one embodiment, the driving circuit 23 may be used to provide the common voltage signal to the stripe-shaped common electrodes 22 via common electrode lines 221 during each display stage, and provide the data signal to the touch-control sub-electrodes TX11, TX12, . . . , TX1a, TX21, TX22, . . . , TX2b, TXN1, TXN2, . . . , TXNm. The driving circuit 23 may be used to provide the touch detection signal to the touch-control sub-electrodes TX11, TX12, . . . , TX1a, TX21, TX22, . . . , TX2b, TXN1, TXN2, . . . , TXNm during the touch detection stage.

Further, during the touch detection stage, the driving circuit 23 may provide a fixed low voltage signal, for example, a ground voltage signal, to the stripe-shaped common electrodes 22. That is, the stripe-shaped common electrodes 22 may be connected to ground.

By supplying signals to the touch-control sub-electrodes TX11, TX12, . . . , TX1a, TX21, TX22, . . . , TX2b, TXN1, TXN2, . . . , TXNm and the common electrodes 22 via the driving circuit 23 on the array substrate 400, a display device containing the array substrate 400 may be controlled for display and touch detection.

During a frame display period, a plurality of display and a plurality of touch detection may be executed. Because each touch-control sub-electrode TX11, TX12, . . . , TX1a, TX21, TX22, . . . , TX2b, TXN1, TXN2, . . . , TXNm may be directly and electrically connected to the driving circuit 23, the driving circuit 23 may directly provide the touch detection signal to the touch-control sub-electrodes TX11, TX12, . . . , TX1a, TX21, TX22, . . . , TX2b, TXN1, TXN2, . . . , TXNm, or directly receive the touch-control sensing signal returned by the touch-control sub-electrodes TX11, TX12, . . . , TX1a, TX21, TX22, . . . , TX2b, TXN1, TXN2, . . . , TXNm. Because touch-control signal lines are no longer needed for signal transmission, touch-control signal loss during a transmission process may be decreased, thus reducing the driving power consumption.

Figure 5:
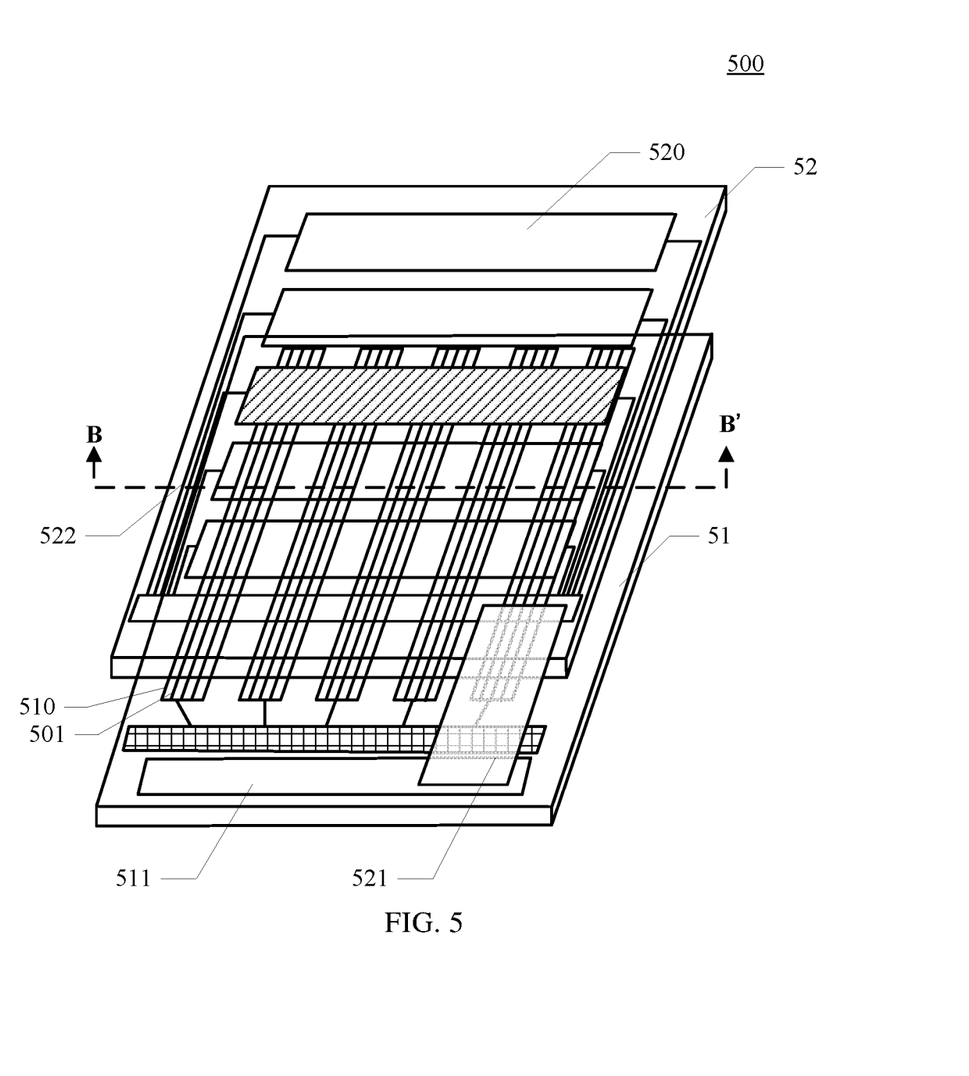
FIG. 5 illustrates an exemplary display panel consistent with disclosed embodiments.

The present disclosure also provides a display panel. Referring to FIG. 5, FIG. 5 illustrates an exemplary display panel consistent with disclosed embodiments. As shown in FIG. 5, a display panel 500 may include an array substrate 51 and a color film substrate 52 disposed opposite to the array substrate 51.

The array substrate 51 may be an array substrate as illustrated in FIG. 1-FIG. 4. The array substrate 51 may also include sub-pixels (not shown in FIG. 5) arranged in an array along the row direction and the column direction, and a plurality of touch-control electrodes arranged along the row direction. The touch-control electrodes may be first touch-control electrodes 510. Each first touch-control electrode 510 may include a plurality of touch-control sub-electrodes 501 arranged along the row direction. Each first touch-control sub-electrode 501 may provide the data signal to a column of sub-pixels during the display stage, respectively.

Second touch-control electrodes 520 may be disposed on the color film substrate 52, and an extension direction of the second touch-control electrodes 520 may intersect the extension direction of the touch-control sub-electrodes 501 in the first touch-control electrodes 510.

Optionally, the second touch-control electrodes 520 may be stripe-shaped touch-control electrodes, and the extension direction of the second touch-control electrodes 520 may be perpendicular to the extension direction of the touch-control sub-electrodes 501 in the first touch-control electrodes 510.

In this embodiment, the display panel 500 may also include a flexible printed circuit (FPC) board 521. The array substrate 51 may also include a driving circuit 511, and the driving circuit 511 may be the driving circuit 23 on the array substrate 400 shown in FIG. 4. Touch-control signal lines 522 may be disposed on the color film substrate 52, the second touch-control electrodes 520 may be electrically connected to the flexible printed circuit board 521 via the touch-control signal lines 522, and the flexible printed circuit board 521 may be electrically connected to the driving circuit 511.

Accordingly, the touch-control signal lines 522 on the color film substrate 52 that are electrically connected to each second touch-control electrode 520 may be coupled together and electrically connected to the flexible printed circuit (FPC) board 521, and may further be electrically connected to the driving circuit 511 via the flexible printed circuit 521. Thus, the driving circuit 511 may provide signals to the second touch-control electrodes 520 or receive signals returned by the second touch-control electrodes 520.

Figure 6:
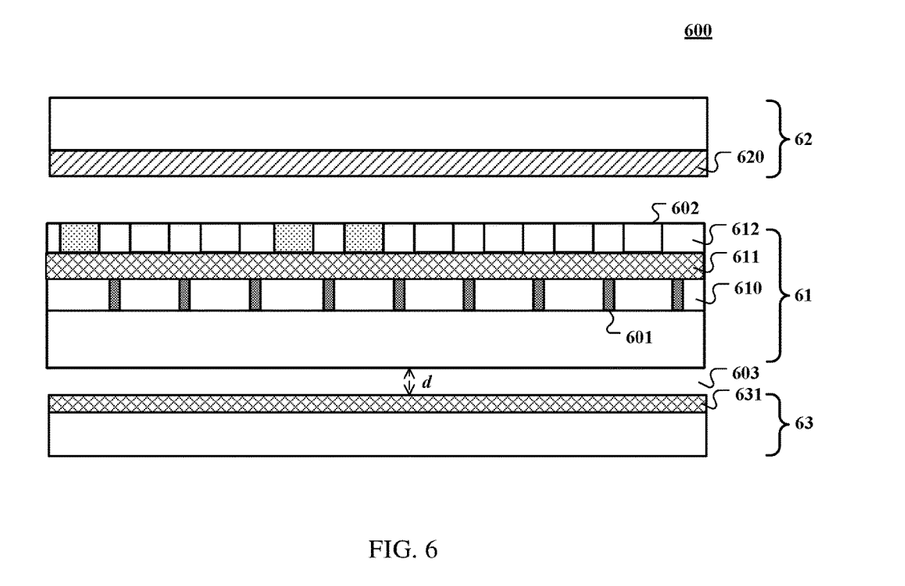
FIG. 6 illustrates a BB' cross-sectional view of a display panel in FIG. 5 consistent with disclosed embodiments.

In some embodiments, the display panel may also include force sensing electrodes, and the force sensing electrodes may be used to for force sensing. The force sensing electrodes may be disposed on a backlight unit (not shown in FIG. 5) on the array substrate facing away the color film substrate. FIG. 6 may be referred to describe the structure of the display panel.

FIG. 6 illustrates a BB' cross-sectional view of the display panel consistent with disclosed embodiments. As shown in FIG. 6, an array substrate 600 may include an array substrate 61, a color film substrate 62, and a backlight unit 63. The color film substrate 62 may be disposed opposite to the array substrate 61. A plurality of sub-pixels arranged in an array along the row direction and the column direction, and a plurality of first touch-control electrodes arranged along the row direction and extended along the column direction may be disposed on the array substrate 61.

The first touch-control electrodes may each include a plurality of touch-control sub-electrodes arranged along the row direction. The array substrate 61 may include a first conductive layer 610 and a second conductive layer 612. Specifically, the touch-control sub-electrodes 601 may be disposed on the first conductive layer, the stripe-shaped common electrodes 602 may be disposed on the second conductive layer 612, and the extension of the common electrodes 602 may be consistent with the extension direction of the touch-control sub-electrodes 601. An insulation layer 611 may be sandwiched between the first conductive layer 610 and the second conductive layer 612.

Second touch-control electrodes 620 may be disposed on the color-film substrate 62, and the extension direction of the second touch-control electrodes 620 may be perpendicular to the extension direction of the touch-control sub-electrodes 601.

Force sensing electrodes 631 may be disposed on the backlight unit 63, and an extension direction of the force sensing electrodes 631 may intersect the extension direction of the touch-control sub-electrodes 601. Optionally, the extension direction of the force sensing electrodes 631 may be perpendicular to the extension direction of the touch-control sub-electrodes 601. A gap 603 may exist between the backlight unit 63 and the array substrate 61. The force sensing electrodes 631, electrodes on the array substrate 61 or the color film substrate 62, and the gap 603 between the backlight unit 63 and the array substrate 61 may form a force sensing capacitor. When being touched, a thickness d of the gap 603 may change, thus varying a capacitance value of the force sensing capacitor. By detecting a change in the force sensing capacitance, a force applied on the display panel 600 may be determined.

The backlight unit 63 in the display panel 600 may also include a light source, a light guide plate, and a diffusion film, etc. To avoid unnecessary obscuration of the present disclosure, structures such as the light source, the light guide plate, and the diffusion film are not shown in FIG. 6.

The present disclosure also provides a driving method to drive the disclosed display panel 500 or 600. During a frame display period, the disclosed driving method may drive the display panel 500 or 600 for display and touch detection.

Specifically, the driving method may include providing the common voltage signal to the stripe-shaped common electrodes and providing the data signal to the touch-control sub-electrodes during each display stage. Further, the driving method may include providing the touch detection signal to the touch-control sub-electrodes during the touch detection stage.

During the display stage, sub-pixels on the array substrate may receive the data signal. During the touch detection stage, the touch-control sub-electrodes may receive the touch detection signal.

Optionally, during each touch detection stage, each first touch-control electrode may be sequentially scanned. Specifically, during each touch detection stage, the touch detection signal may be sequentially inputted into a plurality of first touch-control electrodes. In particular, the touch detection signal may be supplied to all touch-control sub-electrodes in a same first touch-control electrode simultaneously.

Optionally, a frame display period of may include a plurality of display stages and a plurality of touch detection stages, and a plurality of first touch-control electrodes may be scanned in the plurality of touch detection stages, respectively. Specifically, during each touch detection stage, the touch detection signal may be supplied to all touch-control sub-electrodes in one first touch-control electrode, respectively.

A driving circuit may be disposed on the disclosed array substrate, and the driving circuit may be used to execute the above-described driving method. Further, the driving method may also include utilizing the driving circuit to provide a low voltage signal to the second touch-control electrodes disposed on the color film substrate during the display stage. The driving method may also include receiving the touch-control sensing signal returned by the second touch-control electrodes and determining a touch point based on the touch-control sensing signal during the touch detection stage.

When the display panel is touched, the driving circuit may be utilized to provide the touch detection signal to the first touch-control electrodes, the capacitance value of the capacitor formed by the first touch-control electrodes and the second touch-control electrodes may vary. The amount of charges produced by induction of the second touch-control electrode when the display panel is touched may be different from the amount of charges produced by induction of the second touch-control electrode when the display panel is not touched. The driving circuit may measure a change in the capacitance to obtain a difference in capacitance values between the first touch-control electrodes and the second touch-control electrodes, thus determining a touch point location.

Figure 9:
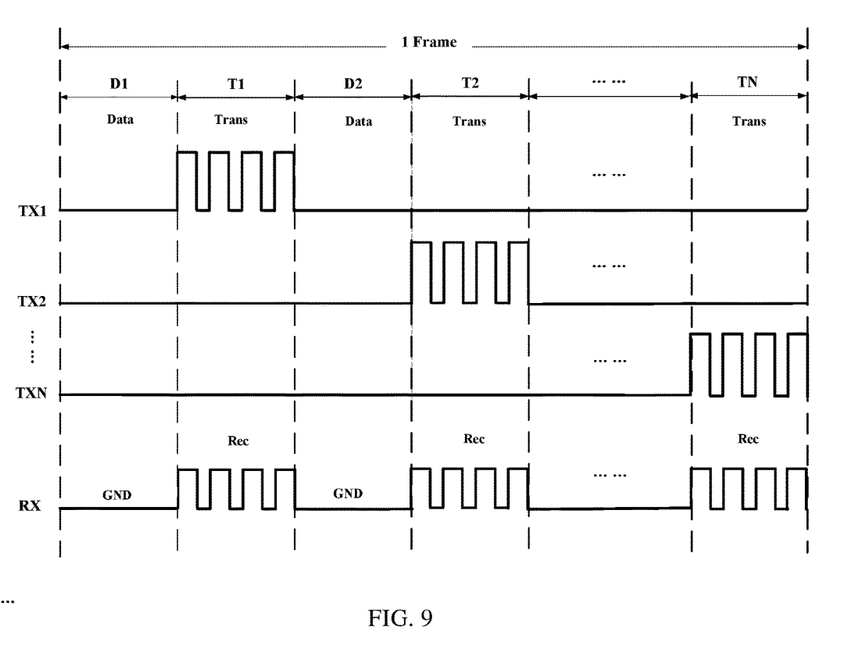
FIG. 9 illustrates an exemplary driving timing sequence of a display panel in FIG. 5 consistent with the disclosed embodiments.

Referring to FIG. 9, FIG. 9 illustrates an exemplary driving scheme of a display panel in FIG. 5, where TX1, TX2, . . . , TXN represent the signal transmitted to the plurality of first touch-control electrodes TX1, TX2, . . . , TXN, and RX represents the signal transmitted to the second touch-control electrodes. As shown in FIG. 9, the driving scheme may include N display stages (D1, D2, . . . , DN) and N touch detection stages (T1, T2, . . . , TN).

During a display stage, a data signal Data may be supplied to the first touch control electrodes, and a fixed low voltage signal (e.g., a ground voltage signal, GND) may be supplied to the second touch-control electrodes RX.

During a touch detection stage, only one first touch-control electrode may be scanned. That is, during a first touch control stage, a touch-control detection signal Trans may be supplied to all sub-electrodes in the first touch-control electrode TX1. During a second touch detection stage, the touch-control detection signal Trans may be supplied to all sub-electrodes in the first touch-control electrode TX2. During an N touch control stage, the touch-control detection signal Trans may supplied to all sub-electrodes in the first touch-control electrode TXN. Further, the second touch-control sub-electrodes Rx may be induced to return a touch detection signal Rec.

For the display panel 600 shown in FIG. 6 that contain force sensing electrodes FIG. 6, other than a display state and a touch detection state, the display panel may also have a force detection state. The above driving method may also include using a driving circuit to provide the force detection signal to the touch-control sub-electrodes during the force detection stage. The driving method may also include using the driving circuit to receive the force sensing signal returned by the force sensing electrodes, and determine a force touch point according to the force sensing signal.

During the force detection stage, the touch-control sub-electrodes may be multiplexed as force sensing reference electrodes, and may form a force sensing capacitor with force sensing electrodes. When a force is applied on the force-sensing capacitor, the capacitance value may vary. By providing the force detection signal to the force sensing reference electrodes and utilizing the force sensing signal returned by the force sensing electrodes, a force location and a force value may be determined.

Figure 7:
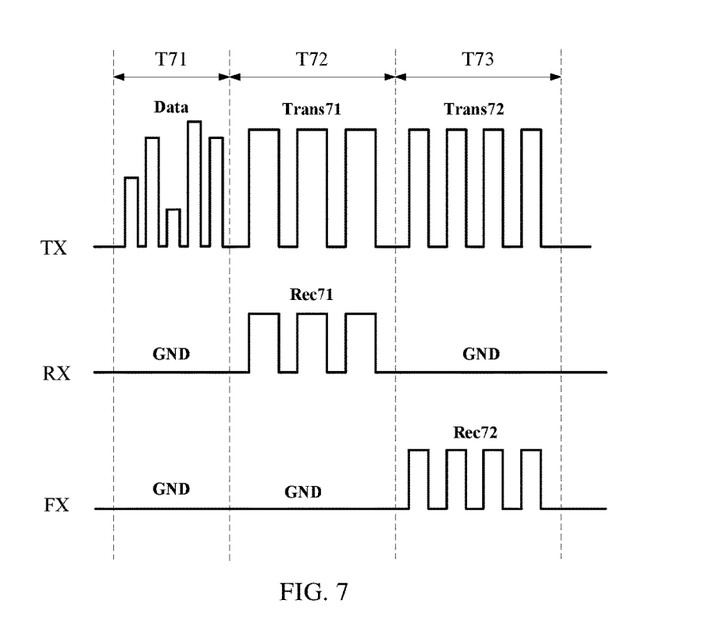
FIG. 7 illustrates an exemplary operational timing sequence of a display panel in FIG. 6 consistent with disclosed embodiments.

Referring to FIG. 7, FIG. 7 illustrates an exemplary operational timing sequence of a display panel shown in FIG. 6 consistent with disclosed embodiments, where TX represents the signal transmitted to the first touch-control electrodes TX, RX indicates the signal transmitted to the second touch-control electrodes RX, and FX represents a signal transmitted to the force sensing electrodes FX.

During a display stage T71, a data signal Data may be supplied to the first touch-control electrodes TX, and a fixed low voltage signal, for example, a ground voltage signal GND, may be supplied to the second touch-control electrodes RX and the force sensing electrodes FX.

During a touch detection stage T72, the touch detection signal Trans71 may be supplied to the first touch-control electrodes TX, and the fixed low voltage signal, for example, the ground voltage signal GND may be supplied to the force sensing electrodes FX, and a touch sensing signal Rec71 may be produced by induction of the second touch-control electrodes RX. In particular, the touch detection signal Trans71 may be a first pulse signal, and the first pulse signal may have a first period.

During a force detection stage T73, a force detection signal Trans72 may be supplied to the first touch-control electrodes TX, a fixed low voltage signal, for example, the ground voltage signal GND may be supplied to the second touch-control electrodes RX, and a force sensing signal Rec72 may be produced by induction of the force sensing electrodes FX. The force detection signal Trans72 may be a second pulse signal, and the second pulse signal may have a second period.

In one embodiment, the first period and the second period may be the same. In certain other embodiments, the first period and the second period may be different.

In some embodiments, during the touch detection stage, the touch detection signal may be supplied to the first touch-control electrodes TX, and the fixed low voltage signal, for example, the ground voltage signal GND, may be supplied to the force sensing electrodes FX and RX. After sensing a touch, the first touch-control electrodes TX may return a touch sensing signal, and the driving circuit may determine the location of the touch point according to the touch sensing signal returned by the first touch-control electrodes TX.

Similarly, the force detection signal may be supplied to the first touch-control electrodes TX during the force detection stage, and the fixed low-voltage signal, for example, the ground voltage signal GND, may be supplied to the second touch-control electrodes RX and the force sensing electrodes FX. The first touch-control electrodes TX may return the force sensing signal after sensing a force, and the driving circuit may determine whether the display panel is touched and further determine the location of the touch point according to the force sensing signal returned by the first touch-control electrodes TX.

The present disclosure also provides a display device including the above display panel.

Figure 8:
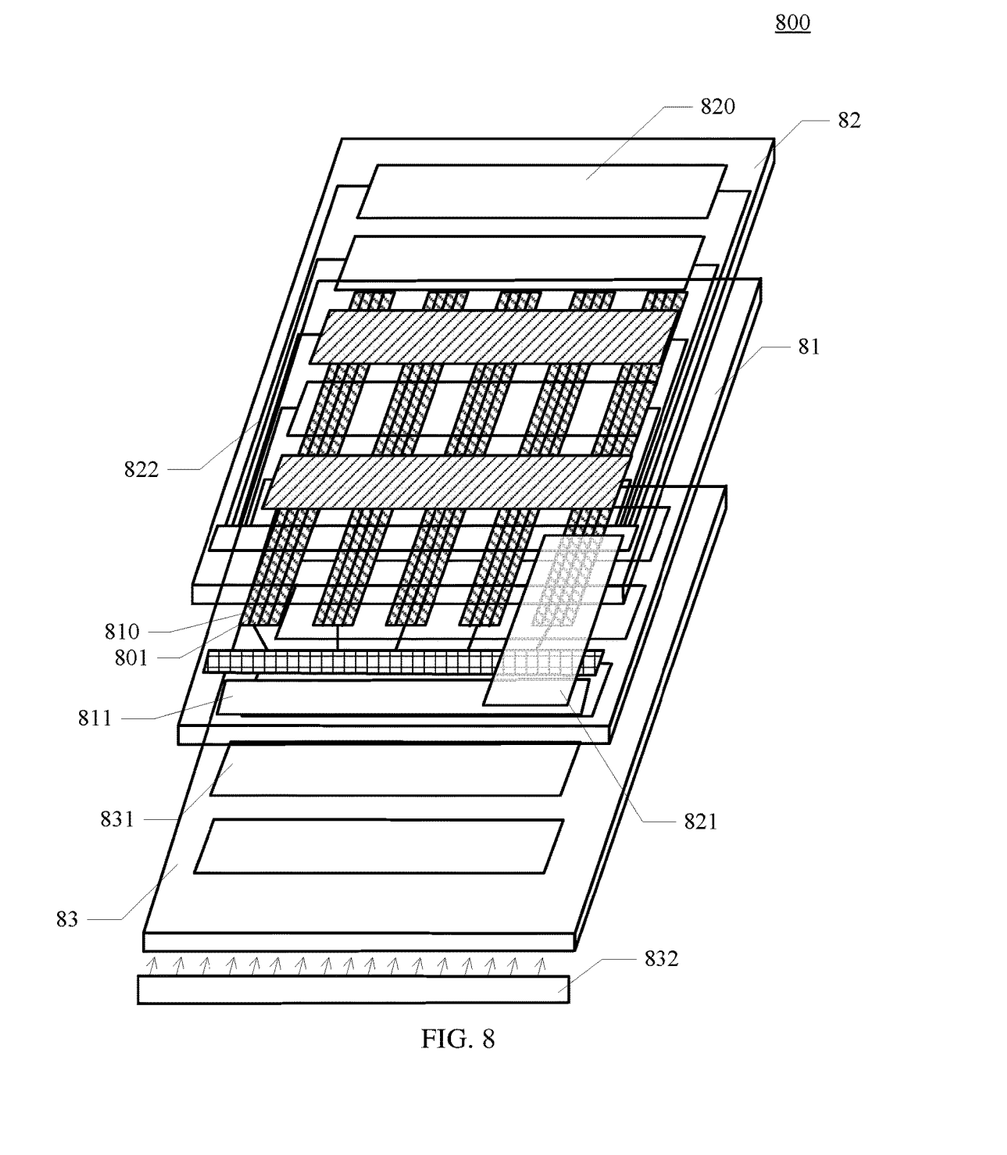
FIG. 8 illustrates an exemplary display device consistent with disclosed embodiments.

Referring to FIG. 8, FIG. 8 illustrates an exemplary display device consistent with disclosed embodiments. The display device may include an array substrate 81 and a color film substrate 82 disposed opposite to the array substrate 81. In particular, the array substrate 81 may be an array substrate as illustrated in FIG. 1-FIG. 4. The array substrate 81 may include a plurality of sub-pixels (not shown in FIG. 8) arranged in an array along the row direction and the column direction, and a plurality of touch-control electrodes arranged along the row direction.

The touch-control electrodes may be first touch-control sub-electrodes 810. Each first touch-control electrode 810 may include a plurality of touch-control sub-electrodes 801 arranged along the row direction. Each touch-control sub-electrode 801 may provide a data signal to a column of sub-pixels during the display stage.

Second touch-control electrodes 820 may be disposed on the color film substrate 82, and the extension direction of the second touch-control electrodes 820 may intersect the extension direction of the touch-control sub-electrodes 801 in the first touch-control electrodes 810.

Optionally, the second touch-control electrodes 820 may be stripe-shaped touch-control electrodes, and the extension direction of the second touch-control electrodes 820 may be perpendicular to the extension direction of the touch-control sub-electrodes 801 in the first touch-control electrodes 810.

In one embodiment, the display device 800 may also include a flexible printed circuit (FPC) board 821. The array substrate 81 may also include a driving circuit 811. Touch-control signal lines 822 may be disposed on the color film substrate 82, the second touch-control electrodes 820 may be electrically connected to the flexible printed circuit (FPC) board 821 via the touch-control signal lines 822, and the flexible printed circuit (FPC) board 821 may be electrically connected to the driving circuit 811.

The display device 800 may also include a backlight unit 83. The backlight unit 83 may be disposed on one side of the array substrate 81 facing away the color film substrate 82. The backlight unit 83 may include force sensing electrodes 831, and the force sensing electrodes 831 may be used for force sensing. The backlight unit 83 may also include a light source 832 and a light guide board. The light source 832 may be disposed on one side of the backlight unit 83, and light may be transmitted to the array substrate 81 after passing through the light guide board.

In the display device 800, the touch-control sub-electrodes may be multiplexed as data signal lines and force sensing reference electrodes, thus realizing a force touch-control function, improving a driving ability of the display device and improving a touch-control effect.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A display panel, comprising:
an array substrate and a color film substrate disposed opposite to the array substrate, wherein:
the array substrate comprises:
a driving circuit,
a plurality of sub-pixels arranged in an array along a row direction and a column direction, and
a plurality of touch-control electrodes arranged along the row direction,
wherein the touch-control electrodes are first touch-control electrodes,
a touch-control electrode includes a plurality of touch-control sub-electrodes arranged along the row direction,
during a display stage, a data line, multiplexed as a touch-control sub-electrode of the plurality of touch-control sub-electrodes, provides a data signal to a column of the sub-pixels,
during a touch detection stage, the driving circuit provides a touch detection signal to the data line multiplexed as the touch-control sub-electrode without using a touch-control signal line, and the touch-control sub-electrode receives the touch detection signal from the driving circuit, and
the color film substrate comprises:
second touch-control electrodes,
wherein during the touch detection stage, the driving circuit receives a touch sensing signal returned by the second touch-control electrodes, and determines a touch point according to the touch sensing signal.

2. The display panel according to claim 1, wherein:
an extension direction of the second touch-control electrodes intersects an extension direction of the touch-control sub-electrodes.

3. The display panel according to claim 2, wherein the second touch-control electrodes are stripe-shaped touch-control electrodes, and the extension direction of the second touch-control electrodes is perpendicular to the extension direction of the first touch-control sub-electrodes.

4. The display panel according to claim 2, further comprising:
a flexible printed circuit board,
wherein the color film substrate includes touch-control signal lines, the second touch-control electrodes are electrically connected to the flexible printed circuit board via the touch-control signal lines, and the flexible printed circuit board is electrically connected to the driving circuit.

5. A display device, comprising the display panel according to claim 1.

6. The display panel according to claim 1, wherein:
during the touch detection stage, the touch detection signal is sequentially supplied to the plurality of touch-control electrodes, and the touch detection signal is simultaneously supplied to all touch-control sub-electrodes of a same touch-control electrode, or
during the touch detection stage, the touch detection signal is supplied to all touch-control sub-electrodes of each touch-control electrode, respectively.

7. The display panel according to claim 1, wherein:
the array substrate further comprises a plurality of stripe-shaped common electrodes arranged along the row direction, and each touch-control sub-electrode is disposed between two adjacent stripe-shaped common electrodes.

8. The display panel according to claim 7, wherein one touch-control sub-electrode is disposed between any two adjacent stripe-shaped common electrodes.

9. The display panel according to claim 7, wherein the touch-control electrodes and the stripe-shaped common electrodes are disposed on different layers.

10. The display panel according to claim 1, wherein:
the array substrate further comprises common electrode lines,
wherein:
the driving circuit is electrically connected to the touch-control sub-electrodes, and the driving circuit is electrically connected to stripe-shaped common electrodes via the common electrode lines; and
the driving circuit is used to provide a common voltage signal to the stripe-shaped common electrodes via the common electrode lines and to provide the data signal to the touch-control sub-electrodes during each display stage.

11. The display panel according to claim 1, wherein:
the array substrate further comprises a plurality of stripe-shaped common electrodes arranged along the row direction and formed by cutting a series of trenches on a planar electrode along the column direction,
wherein the touch-control sub-electrode is disposed in a trench of the series of trenches.

12. A driving method for driving a display panel for display and touch detection during a frame display period, wherein the display panel comprises an array substrate and a color film substrate disposed opposite to the array substrate, wherein: the array substrate comprises a driving circuit, a plurality of sub-pixels arranged in an array along a row direction and a column direction, a plurality of touch-control electrodes arranged along the row direction, and a plurality of stripe-shaped common electrodes arranged along the row direction, wherein the touch-control electrodes are first touch-control electrodes, a touch-control electrode includes a plurality of touch-control sub-electrodes arranged along the row direction, during a display stage, a data line, multiplexed as a touch-control sub-electrode of the plurality of touch-control sub-electrodes, provides a data signal to a column of the sub-pixels, during a touch detection stage, the driving circuit provides a touch detection signal to the data line multiplexed as the touch-control sub-electrode without using a touch-control signal line, and the touch-control sub-electrode receives the touch detection signal from the driving circuit, the touch-control sub-electrode is disposed between two adjacent stripe-shaped common electrodes, and the touch-control sub-electrode receives the touch detection signal from the driving circuit, and the color film substrate comprises second touch-control electrodes, wherein during the touch detection stage, the driving circuit receives a touch sensing signal returned by the second touch-control electrodes, and determines a touch point according to the touch sensing signal, the driving method comprises:
during the display stage, providing a common voltage signal to the stripe-shaped common electrodes, and providing the data signal to the touch-control sub-electrodes; and
during the touch detection stage, providing the touch detection signal to the touch-control sub-electrodes.

13. The driving method according to claim 12, further comprising:

during the touch detection stage, sequentially providing the touch detection signal to the first touch-control electrodes, wherein the touch detection signal is supplied to all touch-control sub-electrodes belonging to a same first touch-control electrode simultaneously; or when the frame display period includes a plurality of display stages and a plurality of touch detection stages, during each touch detection stage, providing the touch detection signal to all the touch-control sub-electrodes in the same first touch-control electrode, respectively.

14. The driving method according to claim 12, further comprising:
during the display stage, providing a ground voltage signal to the second touch-control electrodes;
during the touch detection stage, receiving the touch sensing signal returned by the second touch-control electrodes, and determining the touch point according to the touch sensing signal.

15. The driving method according to claim 14, wherein the display panel also includes a backlight unit disposed on one side of the array substrate facing away a color film substrate, a gap is found between the backlight unit and the array substrate, force sensing electrodes are disposed on the backlight unit, and an extension direction of the force sensing electrodes intersects an extension direction of the touch-control sub-electrodes, and the frame display period further includes a force detection stage, the driving method further comprises:
during the force detection stage, providing a force detection signal to the touch-control sub-electrodes.

16. The driving method according to claim 15, further comprising:
during the force detection stage, receiving the force sensing signal returned by the force sensing electrodes, and determining force touch points according to the force sensing signal.

17. The driving method according to claim 15, wherein:
the touch detection signal is a first pulse signal, and the force detection signal is a second pulsed signal; and
the first pulse signal has a first period, and the second pulse signal has a second period,
during the touch detection stage, the touch detection signal is sequentially supplied to the plurality of touch-control electrodes, and the touch detection signal is simultaneously supplied to all touch-control sub-electrodes of a same touch-control electrode, or
during the touch detection stage, the touch detection signal is supplied to all touch-control sub-electrodes of each touch-control electrode, respectively.

* * * * *